United States Patent [19]  
Tokuoka

[11] 4,309,459  
[45] Jan. 5, 1982

[54] PROCESS FOR PRODUCING SIO₂COATED IRON OXIDE POWDER FOR USE IN THE PREPARATION OF ACICULAR MAGNETIC IRON OR IRON OXIDE POWDER

[75] Inventor: Yasumichi Tokuoka, Tokyo, Japan
[73] Assignee: TDK Electronics Co., Ltd., Tokyo, Japan
[21] Appl. No.: 210,355
[22] Filed: Nov. 25, 1980
[30] Foreign Application Priority Data Nov. 28, 1979 [JP] Japan ............................. 54-152912

[51] Int. Cl.³ ...................... C01G 49/02; C01G 49/06
[52] U.S. Cl. .............................. 427/219; 75/0.5 AA; 148/105; 252/62.59; 423/632; 423/633; 423/274; 423/275; 427/127
[58] Field of Search .................... 252/62.59; 423/632, 423/633, 274, 275; 427/127, 219; 75/0.5 AA; 148/105

[56] References Cited

U.S. PATENT DOCUMENTS 3,947,502 3/1976 Leitner et al. ............... 252/62.59 X
4,043,846 8/1977 Amemiya et al. ........... 252/62.59 X
4,133,677 1/1979 Matsui et al. .................... 423/633 X
4,136,158 1/1979 Okuda ............................ 423/633 X
4,169,912 10/1979 Schonafinger et al. ........ 427/219 X

FOREIGN PATENT DOCUMENTS 52-30758 3/1977 Japan .............................. 75/0.5 AA
7600190 7/1976 Netherlands .................... 252/62.59

Primary Examiner—Jack Cooper
Attorney, Agent, or Firm—Oblon, Fisher, Spivak, McClelland & Maier

[57] ABSTRACT

An SiO₂ coated iron oxide powder used for the preparation of an acicular metallic iron powder or an acicular magnetic iron oxide powder, is produced by forming a slurry of hydrated iron oxide as a starting material or a iron oxide powder having pH of 8 to 14; admixing a water soluble silicate at a ratio of 0.1 to 10 mol % as SiO₂ based on Fe; hydrothermally reacting said mixed slurry at 100° to 250° C. for 5 minutes or longer in a closed reactor, and washing, filtering and drying the product.

3 Claims, 2 Drawing Figures

PROCESS FOR PRODUCING SIO₂ COATED IRON OXIDE POWDER FOR USE IN THE PREPARATION OF ACICULAR MAGNETIC IRON OR IRON OXIDE POWDER

BACKGROUND OF THE INVENTION

1. Field of the Invention

The present invention relates to a process for producing a hydrated iron oxide powder used for producing an iron type acicular magnetic powder which is widely used as a magnetic powder for a magnetic recording medium.

2. Description of the Prior Art

It is well known that important characteristics of a magnetic powder for magnetic recording include a coercive force of a magnetic powder, a dispersibility of a magnetic powder in a magnetic composition for coating and an orientation of a magnetic powder in a magnetic recording tape. As it is well known, these characteristics are important factors which highly affect to the characteristics of the magnetic recording tape. The configuration of the magnetic powder directly relates to these characteristics of the magnetic powder. For example, when the coercive force is given by the shape anisotropy as the conventional magnetic recording medium, the coercive force is increased depending upon the improvement of the acicular property of the particles. The dispersibility is improved by decreasing branched or curved configuration whereby the steric hindrance is decreased to improve the orientation and accordingly, the recording characteristics of the magnetic recording tape are improved. It is important to obtain a magnetic powder having excellent acicular property with smaller branched configuration in the preparation of the magnetic powder for a magnetic recording medium. In the industrial process, hydrated ferric oxide, mainly an acicular particle of goethite α-FeOOH is firstly produced as a starting material and is converted into a magnetic metallic iron powder by heating, dehydrating and reducing it or is converted into Fe₃O₄ powder by partially reducing it or is converted into γ-Fe₂O₃ powder by oxidizing Fe₃O₄ powder. These processes have been usually employed.

The magnetic powders obtained by these processes have configurations depending upon the configuration of the starting material of the acicular goethite. Therefore, in order to obtain a magnetic powder having a desired configuration, it is necessary to control the configuration of the goethite powder. However, in the process of the reduction of the powder, dehydration and the migration of atoms occurs, by which powder are deformed or sintered. Therefore, it is necessary to give a powder which is not easily deformed or sintered each other. It has been found that the deformation of particles and the sintering of particles are remarkably caused if the growth rate of the crystalites of the magnetic particles is remarkable in the step of the reduction.

On the other hand, it is found that the growth of crystalites of the magnetic particles is remarkably inhibited by Si component. There are many proposals based on the phenomenon as disclosed in Japanese Examined Patent Publication No. 19541/1977; and Japanese Unexamined Patent Publication No. 95097/1977; No. 134858/1977; No. 4895/1978; No. 30758/1977; No. 77900/1976; No. 121799/1977; and No. 153198/1977. Various processes for incorporating Si component in the acicular non-magnetic powder as the starting material can be considered as proposed. In the fundamental consideration, these processes can be classified into a process for growing crystals in the presence of Si component in the step of the production of the goethite as the starting material (referring to as A process) and a process for adsorbing Si component as a post treatment, after producing a non-magnetic powder (referring to as B process).

The A process is superior to the B process in view of the uniform incorporation of the Si component, however, it has disadvantage that the growth of the geothite crystals is inhibited to be difficult to obtain the particles having the desired size if the Si content is increased. The B process has not any difficulty on the control of the particle size, however, it is difficult to adsorb uniformly the Si component and the bonding of the Si component to the surface of the particles is not so strong to effectively impart the effect of the Si component. On the contrary, the present invention is to combine both the advantages to overcome the disadvantages so as to attain the superior Si treatment for the goethite.

SUMMARY OF THE INVENTION

It is an object of the present invention to provide a process for producing a magnetic powder wherein the growth of goethite crystals is improved and the particle size of the magnetic powder is controlled and the uniform adsorption of the Si component is attained.

The foregoing and other objects of the present invention have been attained by producing an iron type magnetic powder containing Si component as an acicular magnetic iron oxide or an acicular iron oxide used for a preparation of an acicular metallic iron powder, which comprises forming a slurry of hydrated iron oxide as a starting material or a iron oxide powder having pH of 8 to 14; admixing a water soluble silicate at a ratio of 0.1 to 10 mol % as $SiO_2$ based on Fe; hydrothermally reacting said mixed slurry at 100° to 250° C. for 5 minutes or longer in a closed reactor; and washing, filtering and drying the product.

DETAILED DESCRIPTION OF THE PREFERRED EMBODIMENTS

Figure 1:
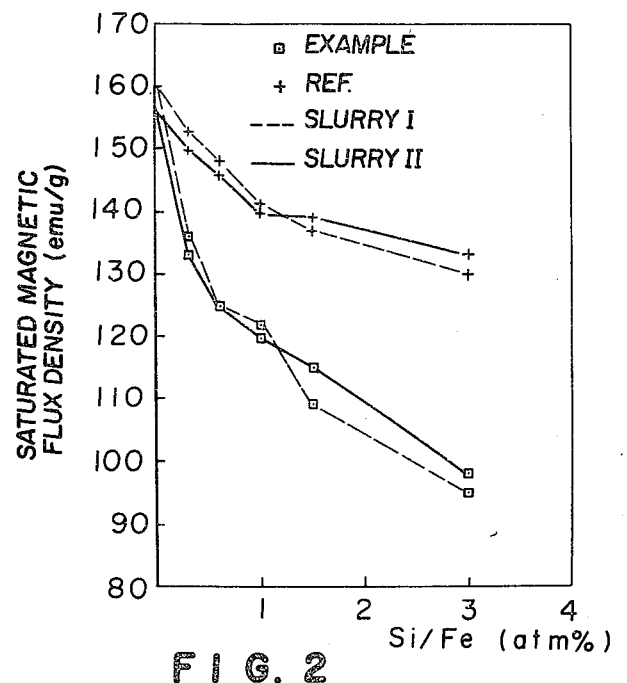
FIG. 1 is a graph showing the relation of saturated magnetic flux densities to molar ratios of Si to Fe of the magnetic powders obtained in Examples and References.

The most important feature of the present invention is to uniformly modify the Si component on the surface of the particles by mixing a water soluble Si salt with an acicular non-magnetic powder and hydrothermally reacting the resulting slurry at high temperature under high pressure so as to provide the merit for the post-treatment of the B process and to uniformly incorporate the Si component to impart the effect same as that of the A process.

The process of the present invention is to produce a hydrated iron oxide or iron oxide containing $SiO_2$ by forming a slurry having pH of 8 to 14 using a hydrated iron oxide powder such as goethite and lepidocrosite or ferric oxide powder obtained by dehydrating the hydrated iron oxide and adding a water soluble silicate to the slurry with stirring and hydrothermally reacting the slurry in a closed reactor such as an autoclave at high temperature under high pressure and washing it with water, filtering and drying it.

The water soluble silicate is preferrably incorporated at a ratio of 0.1 to 10 mol % as $SiO_2$ based on Fe. The condition for the hydrothermal reaction in the slurry is preferably at a temperature of 100° to 250° C. for a time of 5 minutes or longer. The pressure in the autoclave is enough to be the self-generative pressure in the above-mentioned condition.

In accordance with the process of the present invention, the non-magnetic powder as the starting material has remarkably small solubility to water under the atmospheric pressure, however, it has relatively large solubility at high temperature under high pressure, whereby the surface of the non-magnetic powder is slightly dissolved and the Si component may be uniformly doped into the inner part from the surface of the particles in the following reprecipitation step.

In accordance with the process of the present invention, the configuration of the hydrated iron oxide powder or the iron oxide powder containing the $SiO_2$ is improved and the surface of the particles is protected by the uniform $SiO_2$ layer during the following dehydration and reduction or during the following dehydration, reduction and oxidation whereby the sintering of particles is substantially inhibited and the deformation of the particles is inhibited to obtain excellent acicular magnetic iron oxide powder or acicular metallic iron powder.

In the production of the magnetic iron oxide powder such as $Fe_3O_4$ or $\gamma-Fe_2O_3$ or the metallic iron powder from the acicular hydrated iron oxide or iron oxide containing $SiO_2$, the conventional dehydration, the reduction and the oxidation are combined as desired.

The present invention will be illustrated by certain examples and references which are provided for purposes of illustration only and are not intended to be limiting the present invention.

Preparation of Slurry I

Into a reactor containing 10 liter of 1 N-NaOH aqueous solution, 10 liter of an aqueous solution of 3 mol of $FeSO_4$ was added and the mixture was heated at 50° C. under bubbling air at a feed rate of 5 liter/min. to continue the oxidation for 20 hours whereby an acicular goethite was obtained. The resulting slurry is referred to as Slurry I.

Preparation of Slurry II

Into 1 liter of an aqueous solution of 3 mol of $FeCl_3$, 4.5 liter of an aqueous solution of 12.2 mol of NaOH was added dropwise at a rate of 50 ml/min. and the resulting precipitate of ferric hydroxide was aged at room temperature for 24 hours. After 24 hours, the slurry was charged together with the mother liquor into an autoclave and the hydrothermal reaction was carried out at 200° C. for 1 hour under high pressure. The resulting slurry containing goethite is referred to as Slurry II.

EXAMPLE 1

Each sodium silicate solution having a concentration of 20 wt. % as $SiO_2$ was added to the Slurry I or II of goethite at each ratio shown in Table 1 with stirring. The slurry with the mother liquor was charged into an autoclave and the hydrothermal reaction was carried out at 200° C. for 1 hour under high pressure. The product was washed, filtered, dried and ground. Each magnetic powder was produced by heat-treating 1 g. of each powder in hydrogen gas flow at 450° C. for 2 hours. The magnetic characteristics of the resulting samples (E-3 to E-12) were tested. The results are shown in Table 2 and FIGS. 1 and 2.

REFERENCE 1

The Slurry of I or II of goethite was washed, filtered, dried and ground and the hydrothermal reaction was carried out in the same condition of Example 1 to obtain the magnetic powders. The resulting samples and referred to as C-1 and C-2.

REFERENCE 2

Each aqueous solution of sodium silicate was added with stirring in the same condition of Example 1 and the product was washed, filtered, dried and ground without the hydrothermal reaction and then, the product was heat-treated in hydrogen gas flow as the process of Example 1 to obtain the magnetic powders (C-3 to C-12). The conditions for the treatments and the sample numbers are shown in Table 1. The magnetic characteristics of the resulting magnetic powders were tested. The results are shown in Table 2 and FIGS. 1 and 2.

TABLE 1

| Condition for treating Sample | | | | | | | | | | | | |
|---|---|---|---|---|---|---|---|---|---|---|---|---|
| Amount of 20% $SiO_2$ added as the aq. sol. (g) | 0 | | 2.7 | | 5.4 | | 9 | | 13.5 | | 2.7 | |
| Si/Fe(atm. %) | 0 | | 0.3 | | 0.6 | | 1.0 | | 1.5 | | 3.0 | |
| Kind of Slurry | I | II | I | II | I | II | I | II | I | II | I | II |
| Sample No. as Example | — | — | E-3 | E-8 | E-4 | E-9 | E-5 | E-10 | E-6 | E-11 | E-7 | E-12 |
| Sample No. as Reference | C-1 | C-2 | C-3 | C-8 | C-4 | C-9 | C-5 | C-10 | C-6 | C-11 | C-7 | C-12 |

TABLE 2

| | | Magnetic characteristics of Sample | | | | | | |
|---|---|---|---|---|---|---|---|---|
| Si/Fe | Sample No. | Hc(Oe) | $\sigma s$ (emu/g) | $\sigma r/\sigma s$ | Sample No. | Hc(Oe) | $\sigma s$ (emu/g) | $\sigma r/\sigma s$ |
| | | | | | C-1 | 950 | 160 | 0.45 |
| | | | | | C-2 | 980 | 156 | 0.46 |
| 0.3 | E-3 | 1280 | 136 | 0.58 | C-3 | 989 | 153 | 0.49 |
| 0.6 | E-4 | 1310 | 125 | 0.59 | C-4 | 1150 | 146 | 0.49 |
| 1.0 | E-5 | 1609 | 122 | 0.60 | C-5 | 1215 | 140 | 0.51 |

TABLE 2-continued

| Si/Fe | Sample No. | Hc(Oe) | $\sigma s$ (emu/g) | $\sigma r/\sigma s$ | Sample No. | Hc(Oe) | $\sigma s$ (emu/g) | $\sigma r/\sigma s$ |
|---|---|---|---|---|---|---|---|---|
| 1.5 | E-6 | 1570 | 109 | 0.61 | C-6 | 1295 | 139 | 0.54 |
| 3.0 | E-7 | 1450 | 95 | 0.60 | C-7 | 1300 | 133 | 0.55 |
| 0.3 | E-8 | 1200 | 133 | 0.59 | C-8 | 1015 | 150 | 0.48 |
| 0.6 | E-9 | 1320 | 125 | 0.59 | C-9 | 1100 | 148 | 0.50 |
| 1.0 | E-10 | 1400 | 120 | 0.62 | C-10 | 1150 | 141 | 0.53 |
| 1.5 | E-11 | 1350 | 115 | 0.63 | C-11 | 1230 | 137 | 0.54 |
| 3.0 | E-12 | 1320 | 98 | 0.59 | C-12 | 1200 | 130 | 0.55 |

Figure 2:
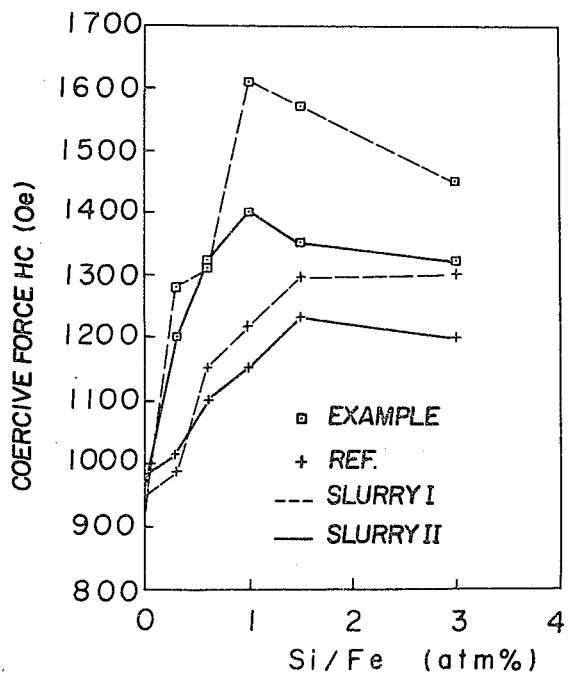
FIG. 2 is a graph showing the relation of coercive forces to molar ratios of Si/Fe of the magnetic powders.

In the step of converting from goethite into the magnetic powder by the hydrothermal reaction, the original particles form skeletons to result growth of many crystals inside of the original particles. Depending upon the growth of the crystals, the configuration of the skeletons of particles are deformed and the coercive force and the acicular ratio are decreased but the saturated magnetization is increased as the magnetic characteristics. In view of these facts, FIGS. 1 and 2 are studied to find the fact that the growth of crystals in the skeleton particles is remarkably supressed in the examples using Slurry I and Slurry II. According to an electron microscopic observation, it was confirmed that the deformation of the particles of the examples was remarkably small.

In the process of the present invention, as it is found by the measurements of the magnetic characteristics of the samples, the particles are reduced to be metallic iron. In usual, it is possible to select the product from the magnetic iron oxide to the magnetic metallic iron depending upon the condition in the conversion from the goethite powder to the magnetic powder by the heat treatment. For example, the magnetic iron oxide powder can be obtained by an interruption of the reduction by the heat treatment at the step of the reaction prior to form the metallic powder.

When it is reduced into the metallic powder, it is necessary to eliminate oxygen atoms forming the main lattice of goethite as the starting material whereby the shift of atoms is severest. If the deformation of the particles caused by the heat treatment can be minimized at this stage, it is further effective in the case of the production of the magnetic iron oxide obtained by the interruption of the reaction.

The starting materials for the hydrothermal reaction can be acicular goethite as well as acicular lepidocrosite ($\gamma$-FeOOH) or $\alpha Fe_2O_3$ powder obtained by dehydrating them.

I claim:

1. A process for producing $SiO_2$-coated iron oxide powder, for use in the preparation of acicular magnetic iron powder or acicular magnetic iron oxide powder, comprising: forming an aqueous slurry of an iron oxide selected from the group consisting of acicular goethite, acicular lepidocrosite and alpha-$Fe_2O_3$, having a pH of 8-14; admixing a water-soluble silicate in an amount of 0.1-10 mole percent, as $SiO_2$ based on Fe; charging the resultant mixture into an autoclave at 100°-250° C. for at least 5 minutes, to effect hydrothermal reaction at high pressure, the pressure in the autoclave being self-generative; and washing, filtering and drying the resulting product.

2. The process according to claim 1, wherein the $SiO_2$ component is partially doped in the inner part of the iron oxide and partially adsorbed on the surface thereof in said hydrothermal reaction.

3. The process according to claim 1 wherein said water soluble silicate is an alkali metal silicate.

* * * * *